(12) United States Patent
Anders et al.

(10) Patent No.: US 12,345,176 B2
(45) Date of Patent: Jul. 1, 2025

(54) ROTOR-BLADE TIP INCLUDING COOLING CONFIGURATION

(71) Applicant: Siemens Energy Global GmbH & Co. KG, Bayern (DE)

(72) Inventors: Björn Anders, Berlin (DE); Constantin Garske, Birkenwerder (DE); Kay Krabiell, Hohen Neuendorf (DE); Heiko Lammers, Leipzig (DE); Markus Lempke, Immenstadt (DE); Ricardo Nilsson, Düsseldorf (DE); Daniel Vöhringer, Berlin (DE)

(73) Assignee: Siemens Energy Global GmbH & Co. KG, Bayern (DE)

( * ) Notice: Subject to any disclaimer, the term of this patent is extended or adjusted under 35 U.S.C. 154(b) by 0 days.

(21) Appl. No.: 18/559,046

(22) PCT Filed: Apr. 5, 2022

(86) PCT No.: PCT/EP2022/059013
§ 371 (c)(1),
(2) Date: Nov. 4, 2023

(87) PCT Pub. No.: WO2022/238051
PCT Pub. Date: Nov. 17, 2022

(65) Prior Publication Data
US 2024/0229650 A1    Jul. 11, 2024

(30) Foreign Application Priority Data

May 11, 2021    (DE) .................... 10 2021 204 782.3

(51) Int. Cl.
*F01D 5/18*      (2006.01)
*B23P 6/00*      (2006.01)
(Continued)

(52) U.S. Cl.
CPC .............. *F01D 5/187* (2013.01); *B23P 6/007* (2013.01); *F01D 5/005* (2013.01); *F01D 5/20* (2013.01);
(Continued)

(58) Field of Classification Search
CPC ....... F01D 5/187; F01D 5/20; F05D 2240/307
See application file for complete search history.

(56) References Cited

U.S. PATENT DOCUMENTS 4,604,031 A * 8/1986 Moss ..................... F01D 5/187
                                                415/115
5,073,086 A * 12/1991 Cooper .................. F01D 5/187
                                                416/97 R
(Continued)

FOREIGN PATENT DOCUMENTS

DE    112008003545 T5    12/2010
EP        1882817 A2      1/2008
(Continued)

OTHER PUBLICATIONS

PCT International Search Report and Written Opinion of International Searching Authority mailed Jul. 26, 2022 corresponding to PCT International Application No. PCT/EP2022/059013 filed Apr. 5, 2022.

*Primary Examiner* — Eldon T Brockman
(74) *Attorney, Agent, or Firm* — Wolter Van Dyke Davis, PLLC

(57) ABSTRACT

A turbine rotor having an improved rotor tip, which has at least one cooling channel in the rotor blade, the cooling channel, in the region of its cuspidal point, having at least one locally limited constriction that is caused by a thickened portion at the end of a partition of the cooling channel.

16 Claims, 4 Drawing Sheets

(51) Int. Cl.
*F01D 5/00* (2006.01)
*F01D 5/20* (2006.01)

(52) U.S. Cl.
CPC .... *F05D 2230/80* (2013.01); *F05D 2240/307* (2013.01); *F05D 2250/185* (2013.01); *F05D 2260/2214* (2013.01)

(56) References Cited

U.S. PATENT DOCUMENTS

| | | | | |
|---|---|---|---|---|
| 6,019,579 | A * | 2/2000 | Fukuno | F01D 5/187 |
| | | | | 415/115 |
| 6,481,967 | B2 * | 11/2002 | Tomita | F01D 5/186 |
| | | | | 415/115 |
| 6,988,872 | B2 * | 1/2006 | Soechting | F01D 5/186 |
| | | | | 415/115 |
| 7,431,562 | B2 * | 10/2008 | Hooper | F01D 5/20 |
| | | | | 416/97 R |
| 7,674,093 | B2 * | 3/2010 | Lee | F01D 5/187 |
| | | | | 164/369 |
| 7,695,243 | B2 * | 4/2010 | Lee | F01D 5/20 |
| | | | | 415/115 |
| 8,591,189 | B2 * | 11/2013 | Correia | F01D 5/187 |
| | | | | 416/97 R |
| 9,103,217 | B2 * | 8/2015 | Giglio | F01D 5/186 |
| 9,518,468 | B2 * | 12/2016 | Tibbott | F01D 5/20 |
| 9,797,258 | B2 * | 10/2017 | Herzlinger | F01D 5/18 |
| 11,255,196 | B2 * | 2/2022 | Freno | F01D 5/187 |
| 11,486,258 | B2 * | 11/2022 | Poehler | F01D 5/187 |
| 2001/0016163 | A1 | 8/2001 | Tomita | |
| 2007/0140851 | A1 | 6/2007 | Hooper | |
| 2007/0189898 | A1 * | 8/2007 | Hooper | F01D 5/187 |
| | | | | 416/97 R |
| 2008/0118366 | A1 * | 5/2008 | Correia | F01D 5/187 |
| | | | | 416/61 |
| 2008/0145234 | A1 | 6/2008 | Lee | |
| 2009/0155088 | A1 * | 6/2009 | Lee | F01D 5/20 |
| | | | | 416/232 |
| 2009/0165988 | A1 | 7/2009 | Rockstroh | |
| 2012/0222306 | A1 * | 9/2012 | Mittendorf | B33Y 30/00 |
| | | | | 29/889.1 |
| 2013/0343872 | A1 * | 12/2013 | Tibbott | F01D 5/187 |
| | | | | 415/115 |
| 2014/0271226 | A1 * | 9/2014 | Giglio | F01D 5/186 |
| | | | | 416/97 R |
| 2015/0110639 | A1 * | 4/2015 | Herzlinger | F01D 5/18 |
| | | | | 416/96 R |
| 2016/0341046 | A1 | 11/2016 | Feldmann | |
| 2019/0211693 | A1 * | 7/2019 | Rollinger | F01D 5/187 |

FOREIGN PATENT DOCUMENTS

| | | |
|---|---|---|
| EP | 2186999 A1 | 5/2010 |
| EP | 2489838 A2 | 8/2012 |
| EP | 2495397 A2 | 9/2012 |
| EP | 2728117 A1 | 5/2014 |
| EP | 3054093 A1 | 8/2016 |
| EP | 3346093 A1 | 7/2018 |
| GB | 2165315 A | 4/1986 |
| JP | 2004132218 A | 4/2004 |
| WO | 2019245546 A1 | 12/2019 |

* cited by examiner

ROTOR-BLADE TIP INCLUDING COOLING CONFIGURATION

CROSS REFERENCE TO RELATED APPLICATIONS

This application is the US National Stage of International Application No. PCT/EP2022/059013 filed 5 Apr. 2022, and claims the benefit thereof, which is incorporated by reference herein in its entirety. The International Application claims the benefit of German Application No. DE 10 2021 204 782.3 filed 11 May 2021.

FIELD OF INVENTION

The invention relates to an improved design for a blade tip of a turbine blade, which may be used for new parts or repaired components, and a method.

BACKGROUND OF INVENTION

Turbine blades are used in turbines, in particular such as gas turbines for generating power or for aircraft and/or steam turbines, and often have a cooling structure or an internal structure inside.

In particular, the blade tip is exposed to extremely high temperatures and high mechanical loads during use and therefore often needs to be overhauled or replaced with a completely new blade.

The prior art involves reconstructing the original design in the case of components to be repaired or reproducing an original component as new.

SUMMARY OF INVENTION

An object of the invention, therefore, is to demonstrate a design and a method for improving the cooling of the blade tip.

The object is achieved by a blade tip as claimed and a method as claimed.

Further advantageous measures are listed in the subclaims and may be combined with one another as required to achieve further advantages.

The blade tip is understood to be the outer visible blade tip itself and an upper blade region including the internal structure in the blade airfoil and a cooling system.

DETAILED DESCRIPTION OF INVENTION

The figures and the description merely represent exemplary embodiments of the invention.

Figure 1:
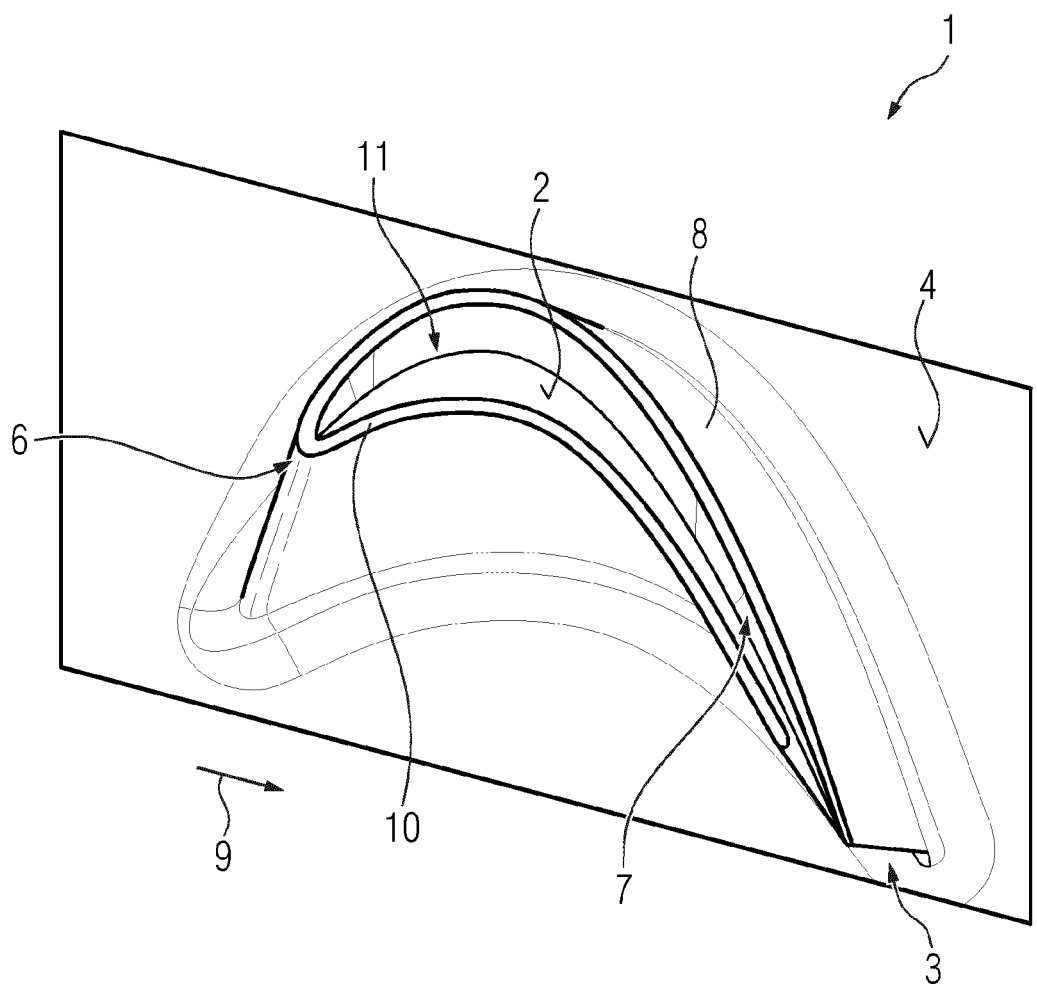
FIG. 1 shows a plan view of the turbine blade in the case of a repair.

FIG. 1 shows a view from above of a blade tip 7 with the blade-tip floor 2 of a turbine blade 1. A blade platform 4 can be seen, from which a blade airfoil 8 extends to the blade tip 7. The blade airfoil 8 extends from the leading edge 6 to the trailing edge 3 in a circulating flow direction 9. The blade tip 7 preferably has, at its distal end, a blade-tip wall 10, which extends, at least in places and, in this case, preferably continuously, along the circumference of the blade tip 7 from the trailing edge 3 to its end, and between which a depression 11 is therefore present.

Figure 2:
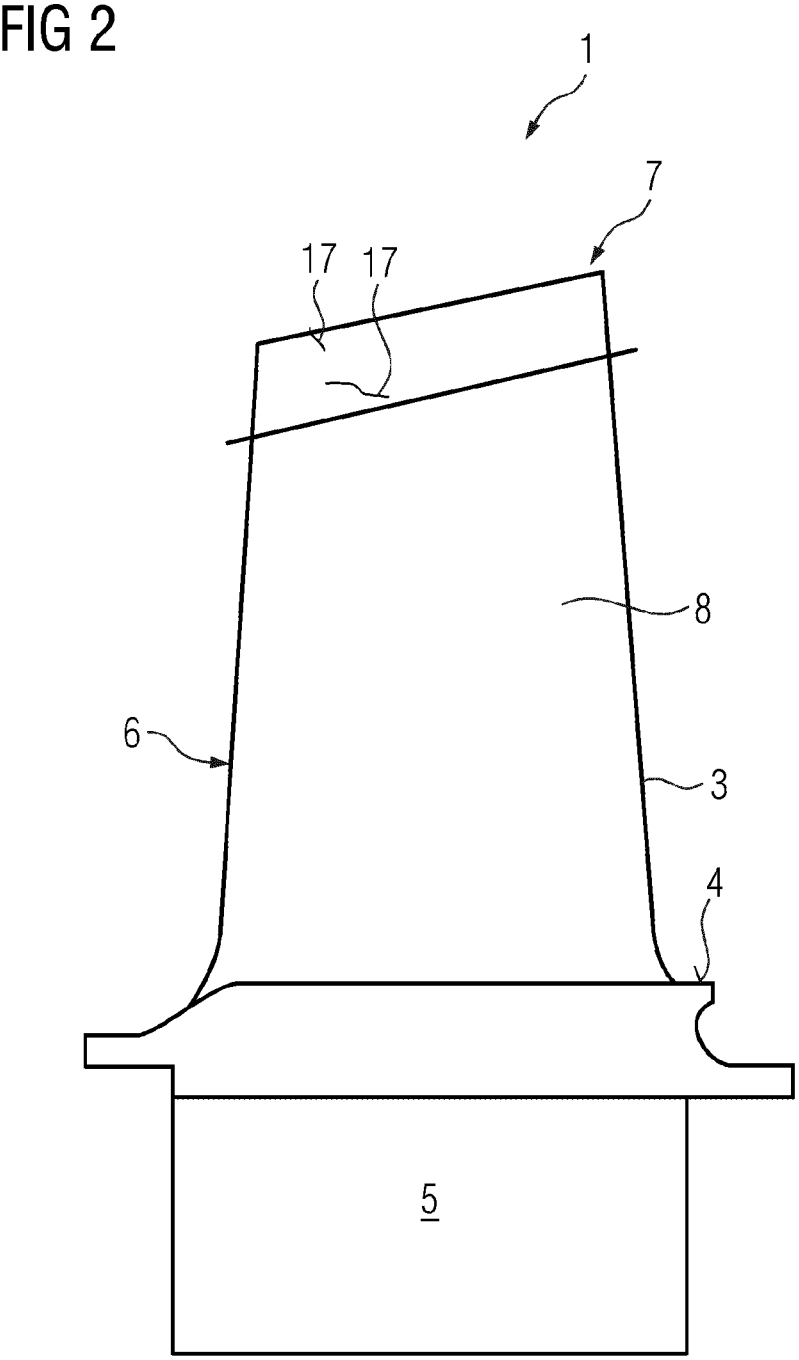
FIG. 2 shows a side view of a turbine blade to be repaired.

FIG. 2 shows a side view according to FIG. 1, with possible defects 17 in the region of the blade tip 7.

A blade root 5 below the blade platform 4 can also be seen in FIG. 2.

Figure 3:
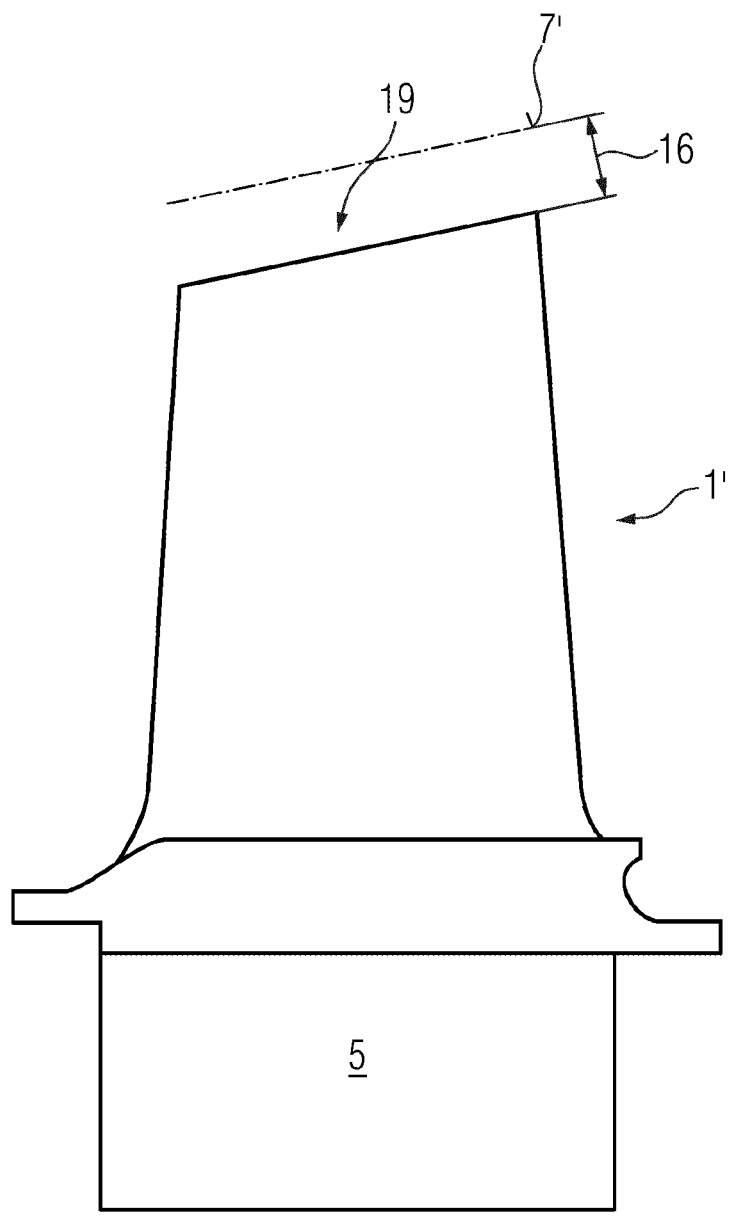
FIG. 3 shows a treated, repaired turbine blade or a newly produced turbine blade.

The defects 17 must be removed so as to produce a component to be repaired according to FIG. 3, in which a defective region 16 of the blade tip 7' (indicated as a dashed line here) has been removed.

The treated turbine blade 1' then has an open end 19 corresponding to the form of the internal cavity/cavities.

It is also possible to remove more than the defective region 16, in particular to achieve a standard removal depth.

Likewise, according to FIG. 3, a new part may also be cast in this way without a blade-tip floor 2.

Figure 4:
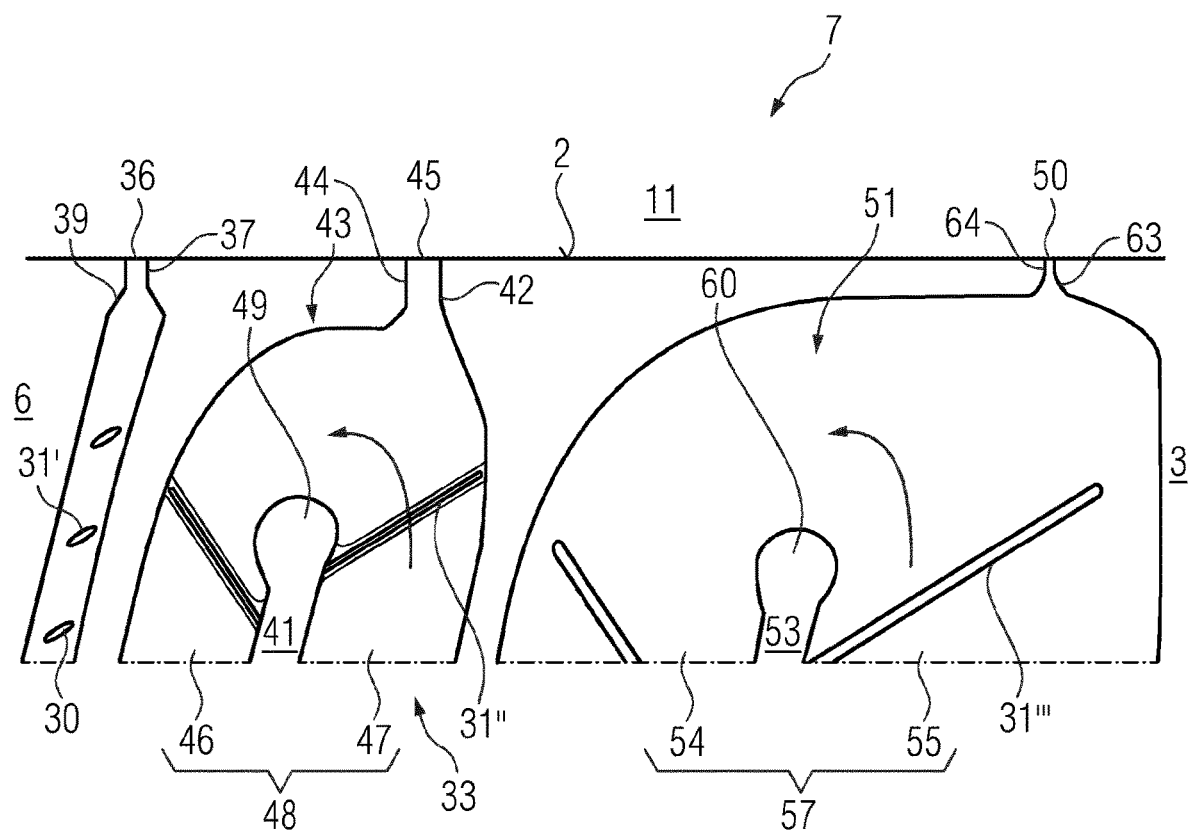
FIG. 4 shows an improved design for a cooling structure in the region of the blade tip.

Using a blade tip 7 as an example, FIG. 4 now shows inside an improved cooling design.

Inside the turbine blade 1, a plurality of cooling channels 30, 48, 57 are preferably present in the blade airfoil 8.

A first cooling channel 30 is arranged along the leading edge 6 of the turbine blade 1 in the region of the leading edge 6. The first cooling channel 30 has an, in particular, tubular form and is supplied with coolant originating from the blade root 5 (FIG. 2).

In particular, a first outlet opening 36, from which the coolant flows in the region of the depression 11 (FIG. 1) of the blade tip 7, is located at the end of the first cooling channel 30.

A first transition 39, which is, in particular, present from the first cooling channel 30 to the first discharge opening 36 has an, in particular, conical form, i.e. in particular, the cross section of the first cooling channel 30 narrows to a smaller diameter, wherein, in particular, a first channel 37 then extends with a preferably constant diameter to the blade tip 7.

The transition from the first cooling channel 30 to the outlet opening 36 may also have a different form.

In particular, turbulators 31' may also be arranged, in particular, in the first cooling channel 30. The design and prevalence of these turbulators 31' may also be freely selected to achieve a favorable flow with a specific/high heat exchange. Such results may be achieved by selecting the surface roughness.

A U-shaped second cooling channel 48 runs essentially through the blade airfoil 8 and runs from the blade root 5 to the blade tip 7 along the first limb 47, makes a U-turn at a reversal point 43 in the region of the blade tip 7 and runs back again along the second limb 46.

According to the invention, a first thickening 49, in particular in the form of vane-like elements at the end of the first divider 41 between the first 47 and second limb 46, is present in the region of the reversal point 43 and results in the cooling medium passing through a narrowing as it flows into this region in the direction of the blade tip 7 and then expanding and in turn passing through a second narrowing in the second limb 46.

As a result, the flow inside the second cooling channel 48 does not separate—or separates only slightly—from the wall of the cooling channel 48.

This results in improved cooling.

A second outlet opening 45 may preferably likewise be present at the reversal point 43 of the second cooling channel 48, which second outlet opening 45 has a conical second transition 42 (similar to the transition 39), which is likewise designed to preferably narrow conically, wherein, in particular, a second channel 44 (similar to the first channel 37) then extends with a preferably constant diameter to the blade tip 7.

The second outlet opening 45 is formed in the region of the reversal point 43 of the second cooling channel 48, preferably on the side with the first limb 47 of the upflow region.

Further outlet openings may preferably be present in the region of the reversal point 43 of the second cooling channel 48.

The cross section of the first limb 47, i.e. the inflow region, is likewise preferably designed to be wider than the second limb 46 of the outflow region.

In particular, turbulators 31" may also be arranged in the second cooling channel 48.

The design and prevalence of these turbulators 31" may also be freely selected to achieve a favorable flow with a specific/high heat exchange. Such results may be achieved by selecting the surface roughness.

Depending on its size, the blade airfoil 8 may preferably furthermore have a third cooling channel 57, which is comparable to the second cooling channel 48 and has a first limb 55 and a second limb 54 in which the cooling medium flows in the direction of the blade tip 7, wherein a second thickening 60 is likewise present here at the end of a second divider 53 between the first 55 and second limb 54 of the third cooling channel 57.

An outlet opening 50 having an, in particular, conical second transition 63 into a third channel 64 is preferably also present in the region of the second reversal point 51.

In the third cooling channel 64 here, the cross section of the inflow limb 55 is likewise designed to be comparatively larger than the cross section of the outflow limb 54.

The two limbs 54, 55 of the third cooling channel 57 are each formed to be wider than the limbs 46, 47 of the intermediate second cooling channel 48.

This improved design may also be produced directly in a new part.

As such, the new part may be cast or constructed entirely using AM and an improved cooling design according to FIG. 4 is constructed separately.

In the case of repair, this enables an improved cooling design to be provided.

It is likewise possible to repair, construct and therefore improve rotor blades of competitors.

The design options of the additive structure on the blade cavity may enable the following functions:
Multi-walled structure for separating air into individual sections and positioning it in a specific manner;
Cross-sectional adaptations for achieving specific flow properties, such as turbulent and/or laminar flow-achieving features;
Deflector plates, with an, in particular, vane-like configuration in 2D and 3D profile, for enabling the flow to be deflected or directed;
Heat-transfer features, which provide enlarged surfaces, in particular due to a spongy structure using LPBF;
Structural features which may secure a large area due to a large number of small "filler elements" (e.g. supporting structure).

The invention claimed is:
1. A turbine blade, comprising:
a blade tip, comprising a first cooling channel and a second cooling channel in a blade airfoil,
wherein the first cooling channel is disposed between a leading edge of the turbine blade and the second cooling channel,
wherein the second cooling channel comprises an inflow limb leading to a reversal region, an outflow limb from the reversal region, and a divider wall between the inflow limb and the outflow limb,
wherein a thickening of an end of the divider wall causes a first narrowing of the second cooling channel at an entrance to the reversal region and a second narrowing of the second cooling channel in the outflow limb,
wherein the second cooling channel comprises at least one outlet opening in the reversal region and through an external wall of the turbine blade,
wherein the at least one outlet opening comprises a discharge opening in an external surface of the external wall,
wherein the at least one outlet opening comprises a conical transition that leads to the discharge opening, and
wherein the discharge opening and the conical transition that leads to the discharge opening are located on the inflow limb side of the divider wall.
2. The turbine blade as claimed in claim 1,
wherein a width of the inflow limb immediately before the reversal region is greater than a width of the outflow limb immediately after the reversal region.
3. The turbine blade as claimed in claim 1, further comprising:
turbulators in the second cooling channel.
4. The turbine blade as claimed in claim 1, the blade tip further comprising a third cooling channel:
wherein the third cooling channel comprises a third cooling channel inflow limb leading to a third cooling channel reversal region, a third cooling channel outflow limb from the third cooling channel reversal region, and a third cooling channel divider wall between the third cooling channel inflow limb and the third cooling channel outflow limb,
wherein a third cooling channel thickening of an end of the third cooling channel divider wall causes a first narrowing of the third cooling channel at an entrance to the third cooling channel reversal region and a second narrowing of the third cooling channel in the third cooling channel outflow limb, and
wherein the second cooling channel is disposed between the first cooling channel and the third cooling channel.
5. The turbine blade as claimed in claim 4,
wherein the third cooling channel comprises a third cooling channel outlet opening in the third cooling channel reversal region and through an external wall of the turbine blade, and
wherein the third cooling channel outlet opening comprises a third cooling channel discharge opening in an external surface of the external wall.
6. The turbine blade as claimed in claim 5,
wherein the third cooling channel outlet opening further comprises a third cooling conical transition, and
wherein the third cooling channel discharge opening and the conical transition are located on the inflow limb side of the divider wall.
7. A method for producing a turbine blade, comprising:
producing a turbine blade having a blade tip as claimed in claim 1.
8. The method as claimed in claim 7, further comprising:
applying the blade tip to a newly cast component or a component to be repaired.

9. The method as claimed in claim 7,
wherein an additive method, and/or a powder-bed method, is used.

10. The turbine blade as claimed in claim 1,
wherein the blade tip comprises two second cooling channels in the blade airfoil.

11. The turbine blade as claimed in claim 1,
wherein the blade tip comprises three cooling channels in the blade airfoil.

12. The turbine blade as claimed in claim 1,
wherein the inflow limb, the reversal region, and the outflow limb are free of any openings other than the at least one outlet opening through the external wall of the turbine blade.

13. The turbine blade as claimed in claim 1,
wherein the at least one outlet opening further comprises a channel with a constant cross section between the conical transition and the discharge opening.

14. The turbine blade as claimed in claim 1,
wherein the first cooling channel comprises a tubular form and is configured to be supplied with coolant originating from a blade root.

15. The turbine blade as claimed in claim 1,
wherein the first cooling channel comprises an outlet through the blade tip.

16. The turbine blade as claimed in claim 1,
wherein the first cooling channel is set apart from the second cooling channel by a wall disposed there between.

* * * * *